US012659129B2

(12) United States Patent
Winstrom

(10) Patent No.: US 12,659,129 B2
(45) Date of Patent: Jun. 16, 2026

(54) ANONYMOUS AGGREGATION SERVICE FOR SENSITIVE DATA

(71) Applicant: Apple Inc., Cupertino, CA (US)

(72) Inventor: Lucas O. Winstrom, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 18/497,859

(22) Filed: Oct. 30, 2023

(65) Prior Publication Data

US 2024/0064001 A1 Feb. 22, 2024

Related U.S. Application Data

(62) Division of application No. 17/242,985, filed on Apr. 28, 2021, now Pat. No. 11,838,399.

(60) Provisional application No. 63/023,251, filed on May 12, 2020.

(51) Int. Cl.
| | |
|---|---|
| *H04L 29/06* | (2006.01) |
| *G06F 21/00* | (2013.01) |
| *H04L 9/00* | (2022.01) |
| *H04L 9/08* | (2006.01) |
| *H04L 9/40* | (2022.01) |

(52) U.S. Cl.
CPC ............ *H04L 9/008* (2013.01); *H04L 9/0819* (2013.01); *H04L 63/068* (2013.01); *H04L 2209/08* (2013.01)

(58) Field of Classification Search
None
See application file for complete search history.

(56) References Cited

U.S. PATENT DOCUMENTS

| | | | |
|---|---|---|---|
| 7,260,552 B2 | 8/2007 | Riera Jorba et al. | |
| 8,887,987 B2 | 11/2014 | Yee et al. | |
| 9,396,475 B2 * | 7/2016 | Cristofalo | G06Q 30/02 |
| 10,482,484 B2 | 11/2019 | Gross | |
| 2014/0123299 A1 * | 5/2014 | Jung | G06F 21/62 |
| | | | 726/26 |
| 2014/0123300 A1 * | 5/2014 | Jung | G06F 21/44 |
| | | | 726/26 |
| 2015/0153998 A1 | 6/2015 | Megias | |
| 2017/0046806 A1 * | 2/2017 | Haldenby | G06Q 40/08 |
| 2017/0169252 A1 * | 6/2017 | Ukena-Bonfig | G06F 21/6254 |
| 2018/0337899 A1 * | 11/2018 | Becker | H04L 63/0428 |

(Continued)

FOREIGN PATENT DOCUMENTS

WO WO-2018099577 A1 * 6/2018 ............. H04L 9/008

OTHER PUBLICATIONS

U.S. Appl. No. 17/242,985 , "Non-Final Office Action", Apr. 26, 2023, 7 pages.

(Continued)

*Primary Examiner* — Lisa C Lewis
(74) *Attorney, Agent, or Firm* — Kilpatrick Townsend & Stockton LLP

(57) ABSTRACT

A method is provided for a device participating in a data aggregation service. The device receives, from at least one requesting server, a participant homomorphic encryption key, and a request for data to perform a computation. The device encrypts requested data, including a location identifier, with the participant homomorphic encryption key, and sends, to an aggregation service, the encrypted requested data.

20 Claims, 11 Drawing Sheets

(56)        References Cited

U.S. PATENT DOCUMENTS

2018/0341961  A1 *  11/2018  Carricarte  ............... H04W 4/21
2019/0013950  A1 *   1/2019  Becker  ................. H04L 9/0618
2019/0133731  A1 *   5/2019  Adams  ................ A61C 19/045
2019/0370334  A1 *  12/2019  Bhowmick  ........... G06F 40/242
2020/0019865  A1 *   1/2020  Wang  ........................ H04L 9/50
2020/0201679  A1 *   6/2020  Wentz  .................... G06F 9/468
2020/0387528  A1 *  12/2020  Barrow  .................. G06F 16/29
2022/0004672  A1 *   1/2022  Santarone  ............. G06T 19/006

OTHER PUBLICATIONS

U.S. Appl. No. 17/242,985 , "Notice of Allowability", Aug. 7, 2023, 4 pages.
U.S. Appl. No. 17/242,985 , "Notice of Allowance", Jul. 31, 2023, 7 pages.

* cited by examiner

301

321P

341P

321A

341A

311P

331P

311A

251A

331N

Cnv.

331A

331M receiving, from a requesting server, a participant
homomorphic encryption key
(500)

receiving, from an application on the device, a
request for data
(502)

identifying requested data and creating aggregation
packet [Fig. 6]
(504)

encrypting requested data with the participant
homomorphic encryption key
(506)

sending, to an aggregation service, the encrypted
requested data
(508)

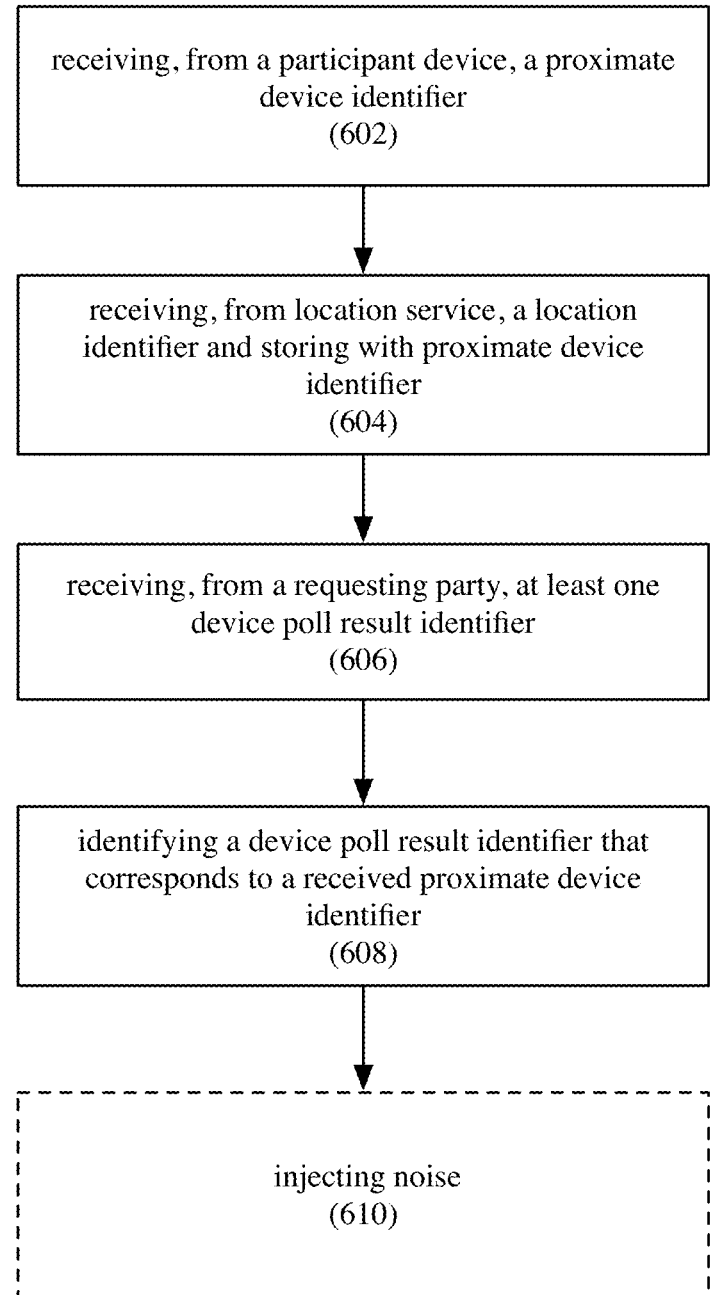

receiving, from a participant device, a proximate device identifier
(602)

receiving, from location service, a location identifier and storing with proximate device identifier
(604)

receiving, from a requesting party, at least one device poll result identifier
(606)

identifying a device poll result identifier that corresponds to a received proximate device identifier
(608)

injecting noise
(610)

*FIG. 6*

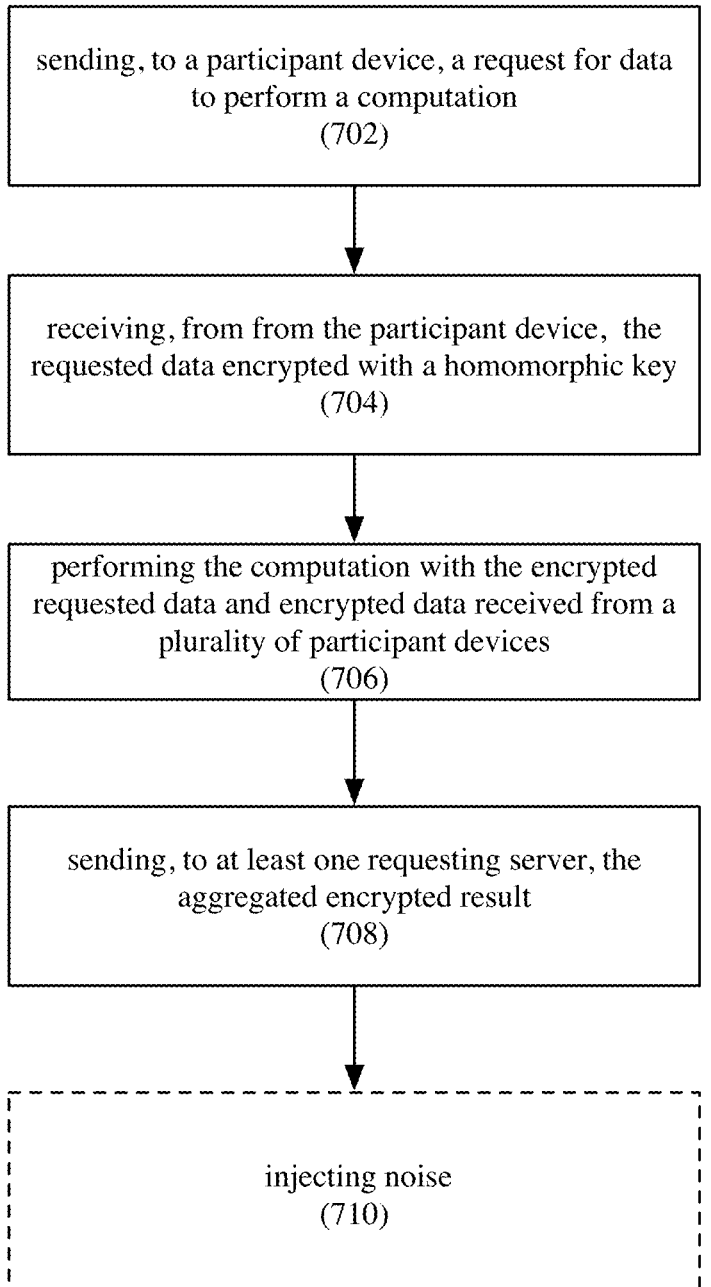

sending, to a participant device, a request for data
to perform a computation
(702)

receiving, from from the participant device, the
requested data encrypted with a homomorphic key
(704)

performing the computation with the encrypted
requested data and encrypted data received from a
plurality of participant devices
(706)

sending, to at least one requesting server, the
aggregated encrypted result
(708)

injecting noise
(710)

*FIG. 7*

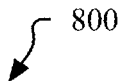
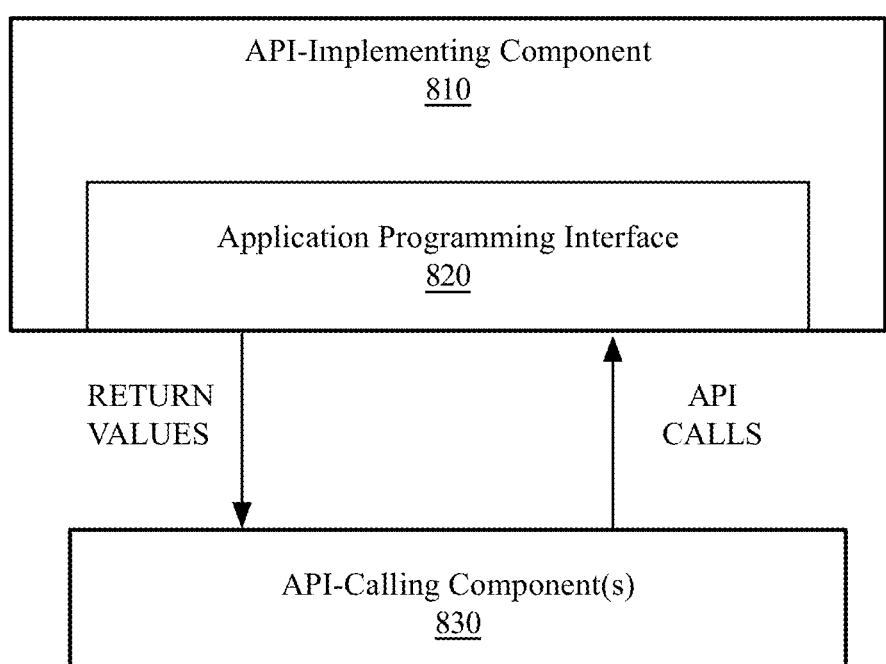
*Fig. 8*

ANONYMOUS AGGREGATION SERVICE FOR SENSITIVE DATA

RELATED APPLICATIONS

This application is a divisional of U.S. patent application Ser. No. 17/242,985, filed Apr. 28, 2021, which claims the benefit of U.S. Provisional Application No. 63/023,251, filed May 12, 2020, the disclosures of which are hereby incorporated by reference in their entirety for all purposes.

FIELD

Embodiments described herein relate to privacy preserving data aggregation services.

BACKGROUND INFORMATION

Homomorphic encryption and threshold cryptosystems are two approaches in the field of cryptography for alleviating privacy concerns when data is shared. Homomorphic encryption is a form of encryption that allows computation on ciphertext, generating an encrypted result which, when decrypted, matches the result of the operations as if they had been performed on the plaintext. In a threshold cryptosystem, a message is encrypted using a public key and the corresponding private key is shared among participating parties. With a threshold cryptosystem, in order to decrypt an encrypted message or sign a message, a threshold number of participating parties must cooperate in the decryption or the signature.

SUMMARY OF THE DESCRIPTION

Various embodiments of privacy preserving data aggregation services will be described herein. Other features and advantages will be apparent from the accompanying drawings and from the detailed description. Other features and advantages will be apparent from the accompanying drawings and from the detailed description.

One embodiment provides a method for a participant device comprising receiving, from at least one requesting server a participant homomorphic encryption key, receiving a request for data to perform a computation, receiving at least one device poll result identifier, wherein the at least one device poll result identifier corresponds to another participant device satisfying a threshold, performing a comparison between the at least one device poll result identifier and a proximate participant device identifier received by the participant device, encrypting requested data with the participant homomorphic encryption key, wherein the requested data comprises a location identifier associated with the proximate participant device identifier and a comparison result for the comparison, and sending, to an aggregation service, the encrypted requested data. The method further comprises receiving, from a proximate participant device, a communication packet with the proximate participant device identifier, wherein the requested data comprises information on whether the participant device received the proximate participant device identifier. In the method, the proximate participant device identifier comprises a rolling key that is periodically generated on the proximate participant device after a defined period of time has elapsed. The method further comprises in response to receipt of the proximate participant device identifier, sending positioning information to a location service, receiving, from the location service, the location identifier, wherein the location identifier corresponds to a map tile identifier, and associating the location identifier with the proximate participant device identifier. In the method, the map tile identifier corresponds to a map tile from a map partitioned into a plurality of tiles based on population density. The method further comprising injecting noise in an aggregation packet containing the encrypted requested data.

One embodiment provides a method for an aggregation server providing aggregation services comprising sending, to a participant device, a request for data to perform a computation, receiving, from the participant device, the requested data encrypted with a homomorphic key, performing the computation with the encrypted requested data and encrypted data received from a plurality of participant devices to generate an aggregated encrypted result, and sending, to at least one requesting server, the aggregated encrypted result. The method further comprising injecting noise in the aggregated encrypted result.

One embodiment provides a data processing system comprising a memory to store instructions, one or more processors to execute the instructions, wherein the instructions cause the one or more processors to perform operations comprising receive, from at least one requesting server, a participant homomorphic encryption key, receive a request for data to perform a computation, encrypt requested data with the participant homomorphic encryption key, wherein the requested data comprises data for the computation and a location identifier associated with an interaction between a proximate participant device and the participant device, and send, to an aggregation service, the encrypted requested data. The data processing system operations further comprising receive, from the proximate participant device, a communication packet with a proximate device identifier, wherein the requested data comprises information on whether the participant device received the proximate participant device identifier. The data processing system proximate participant device identifier comprises a rolling key that is periodically generated on the proximate participant device after a defined period of time has elapsed. The data processing system operations further comprising a positioning system to determine positioning information, wherein, in response to receipt of the proximate device identifier, sending the positioning information to a location service, and receiving, from the location service, the location identifier, wherein the location identifier corresponds to a map tile identified. The data processing system operations further comprising wherein the map tile identifier corresponds to a map tile from a map partitioned into a plurality of tiles. The data processing system operations further comprising receive, from the requesting server, at least one device poll result identifier, compare the at least one device poll result identifier to the proximate device identifier, and send, to the aggregation service, requested data comprising a comparison result.

One embodiment provides a non-transitory machine-readable medium having instructions stored thereon, wherein the instructions cause one or more processors of an electronic device to perform operations comprising receiving, from at least one requesting server, a participant homomorphic encryption key, receiving a request for data to perform a computation, encrypting requested data with the participant homomorphic encryption key, wherein the requested data comprises data for the computation and a location identifier associated with an interaction between a proximate participant device and the participant device, and sending, to an aggregation service, the encrypted requested data. The non-transitory machine-readable medium operations further comprising receiving, from a proximate participant device, a communication packet with a proximate device identifier, wherein the requested data comprises information on whether the participant device received the proximate participant device identifier. The non-transitory machine-readable medium proximate participant device identifier comprises a rolling key that is periodically generated on the proximate participant device after a defined period of time has elapsed. The non-transitory machine-readable medium operations further comprising in response to receipt of the proximate device identifier, sending positioning information to a location service, receiving, from the location service, the location identifier, wherein the location identifier corresponds to a map tile identifier, and associating the location identifier with the proximate device identifier. The non-transitory machine-readable medium map tile is a partition of a map partitioned into tiles based on population density. The non-transitory machine-readable medium operations further comprising receiving, from the requesting server, at least one device poll result identifier, comparing the at least one device poll result identifier to the proximate device identifier, and sending a comparison result to the aggregation service.

The above summary does not include an exhaustive list of all embodiments in this disclosure. All systems and methods can be practiced from all suitable combinations of the various aspects and embodiments summarized above, and also those disclosed in the Detailed Description below

BRIEF DESCRIPTION OF THE DRAWINGS

FIG. 6 is a flow diagram of a method for an aggregation service, according an embodiment.

FIG. 7 is a flow diagram of a method for an aggregation service, according an embodiment.

FIG. 8 is a block diagram illustrating an exemplary API architecture, which may be used in some embodiments of the invention.

DETAILED DESCRIPTION

Embodiments are directed toward provision of an aggregation service for an aggregation of data received from a set of participant devices. The aggregation service may perform a computation with the received data from the set of participant devices. The computation that the aggregation service provides may be a full or a partial mathematical computation with the received data to provide an aggregation result. Mathematical computations that the aggregation service may provide include, but are not limited to, a sum, a count, an average, a minimum, a maximum, a median, and/or any other computation. The data may be collected to perform the computation from the set of participant devices without divulging the identity of any individual participant user and/or the particular data that any individual participant user contributes toward the computation of the aggregation result to the aggregation service and/or a data requesting party. In some embodiments, the aggregation service performs the computation with the data from the participant devices without being able to access (e.g., read) the information received from each individual participant device.

The aggregation service may perform computations on data on behalf of the data requesting party, such as a third party that is an additional party to the participant user and the aggregation service. For example, the participant devices may be requested to indicate a preference in a poll in a location, such as voting on whether the participant user likes a particular song playing at a gym. In another example, the participant device may have data on whether the participant device meets a particular condition at a particular location or in proximity to other users, such as a preference for a type of music and in a particular location or in proximity to other users with similar music preferences. Such an approach allows users to determine when they are or have been amid like-minded people and/or to avoid unlike-minded or people with dissimilar preferences. For example, the approach could be used for anonymous like/dislike voting on any public matter (e.g., Should the TV channel at this bar be changed? Do we want different music in this restaurant?, etc.). In another embodiment, the aggregation service and the data requesting party may be the same.

Figure 1:
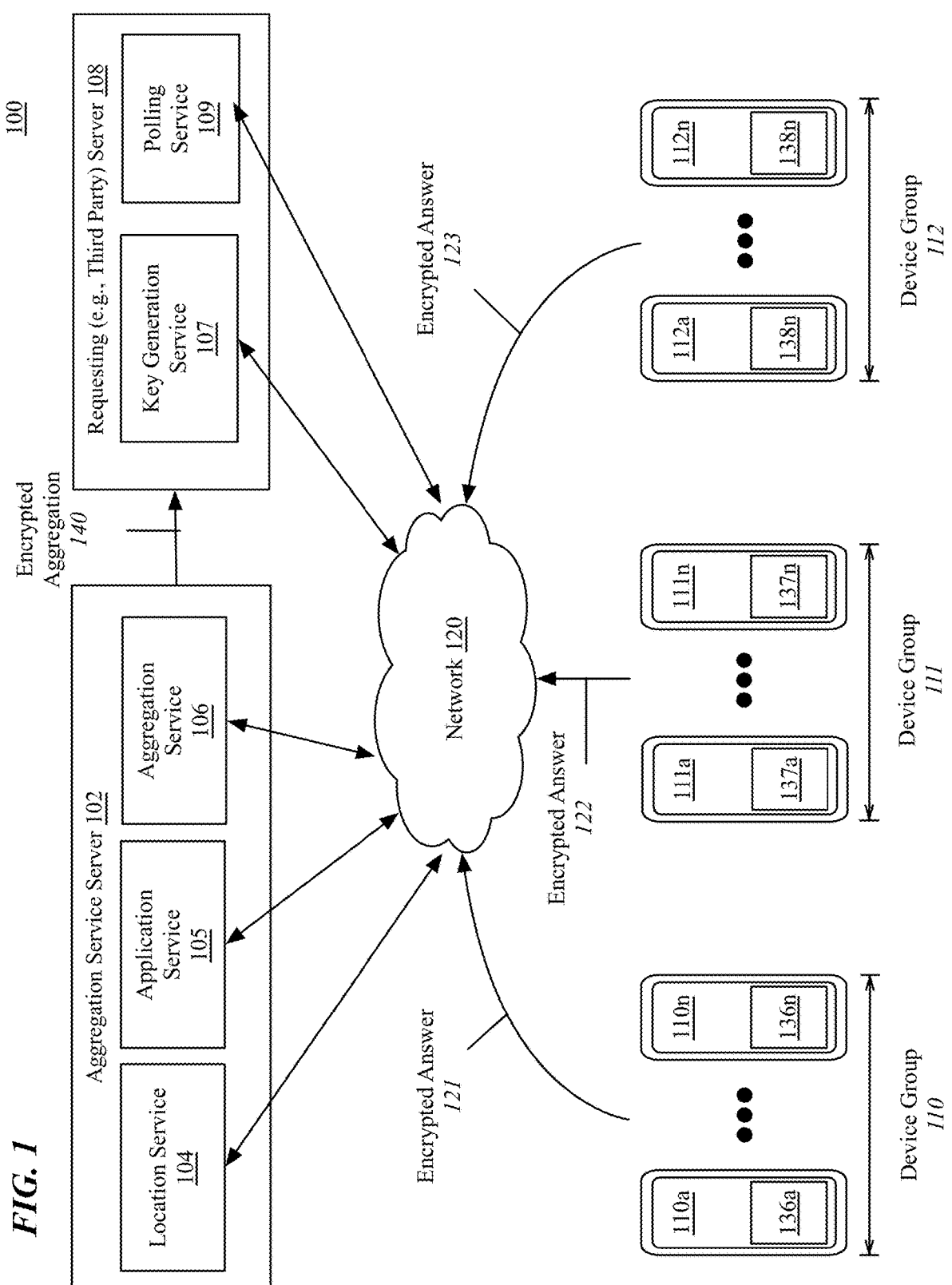
FIG. 1 illustrates a system diagram to enable an aggregation service, according to an embodiment.

FIG. 1 illustrates a system 100 diagram to enable an aggregation service, according to an embodiment. In one embodiment, the system 100 includes servers, an aggregation service server 102 and a requesting server 108, that can communicate with a set of client devices, e.g., participant devices 110a-110n (hereinafter device group 110), 111a-111n (hereinafter device group 111), 112a-112n (hereinafter device group 112) over a network 120. Servers 102 and 108 can be any kind of server, including an individual server or a cluster of servers. Servers 102 and 108 can also be or include a cloud-based server, an application server, a back-end server, a virtual server, or combination thereof. The network 120 can be any suitable type of wired or wireless network, such as a local area network (LAN), a wide area network (WAN), or combination thereof. Each of the participant devices can include any type of computing device such as a desktop computer, a tablet computer, a smartphone, a television set top box, a smart speaker system, a gaming system, a wearable device, a head mounted display device, or other computing device. For example, a client device can be an iPhone®, Apple® Watch, Apple® TV, HomePod™, etc., and can be associated with a user within a large set of users from which data can be aggregated with the permission of the user.

The aggregation service server 102 may provide a location service 104, an application service 105, and an aggregation service 106. The aggregation service 106 may optionally aggregate data from device groups 110, 111, and 112 on behalf of the requesting server 108. In an embodiment, the data requesting party (e.g., a third party requesting server 108) may generate a participant encryption key (e.g., a homomorphic public/private key pair) with a key generation service 107 which is provided to the set of participant devices in device groups 110, 111, and 112. A participant device 110a may encrypt the requested data for the participant device 110a with the received participant encryption key and send the data to the aggregation service 106 (e.g., at the aggregation service server 102). The aggregation service 106 aggregates data according to a computation requested by the requesting server 108 (e.g., a third party requesting server).

In some embodiments, the aggregation service 106 is unable to read or otherwise access the received data from the individual participant device 110*a* (e.g., as shown with encrypted answers 121, 122, and 123 sent from individual participant devices) and/or the aggregated result 140 from the participant devices in groups 110, 111, and 112. The aggregation service 106 sends the encrypted aggregated result 140 to the requesting server 108 (e.g., third party) and the requesting server 108 can use a decryption key (e.g., a stored private key corresponding to the public key used for encryption) to decrypt the aggregated result 140 without learning the participant device user identity and/or the individual underlying data provided by the participating device (e.g., 110*a*). The process can then be reversed to inform the participant devices in device groups 110, 111, and 112 of aggregated results and/or results specific to them, etc. without divulging user identity to the requesting party 108 (e.g., third party) and to the aggregation service 106.

Those with skill in the art will recognize that the participant device group may consist of a set of participants that is a subset of all participant devices in a device group 110 that have been requested to provide data to the aggregation service 106. The participant devices of the participant device group 110 may send an answer 121 to the request for data encrypted using a group participant encryption key provided by the key generation service 107 of the requesting party server 108 and/or the aggregation service 106.

In some embodiments, the answer 121 provided by the individual participant device 110*a* (e.g., similarly, answer 121 from participant device 110*b*, answer 122 from participant device 111*a*, answer 123 from participant device 112*a*) cannot be determined by the aggregation service 106 with the encrypted answer 121 received from the participant device 110*a*. In response to receipt of the answer 121, the aggregation service 106 may return the aggregated encrypted results 140 from the group of participants to each of the participant devices in device group 110 and/or the requesting server 108. Each participant device, such as 110*a*, may execute an algorithm on the participant device 110*a* to create a result (e.g., shown as encrypted answer 121) that does not reveal the aggregated data result (e.g., a sum of affirmative answers to the request), but the result may be combined with all the other participant device results to reveal the aggregated data result 140 (as shown with encrypted aggregation 140, e.g., the sum of affirmative answers to the request). The aggregation service 106 may perform a computation with the encrypted answer 121, 122, and 123 using the properties of homomorphic encryption. Optionally, the aggregation service 106 may inject noise into the results that are aggregated (e.g., encrypted aggregation 140) at the aggregation service server 102 before sending to the requesting server 108.

The requesting server 108 may offer a polling service 109 to allow devices in groups 110-112 to answer a poll. By way of example, participant devices may select a preferred contestant or candidate in a competition on a television program upon request from the polling service 109. Continuing with the example, participant device 110*a* may select a candidate A from the competition poll and communicate the selection to requesting server 108. Requesting server 108 may store an association between a key from device 110*a* as a device poll result identifier and the selection of candidate A. The requesting server 108 may send a set of device poll result identifiers to participant devices (e.g., 110*a*) and the device poll result identifiers may be compared against received proximate device identifiers on participant devices (e.g., 110*a*) to enable aggregation of results. Comparison results between proximate device identifier on the participant device 110*a* and a device poll result identifier from the set may be sent to the aggregation server 106 to compute aggregation results. Continuing with the example, a participant user may discover with aggregated results the number of participant users who similarly selected candidate A in their vicinity.

Location service 104 allows for association of a location identifier with an interaction between proximate devices by providing location identifiers upon request to participant devices (e.g., 110) when the devices are in proximity to other participant devices. Aggregation service server 102 and requesting party 108 may have data on a partitioning of an area (e.g., the world) into a set of location tiles, such that each location may map to a particular tile or a partition of a map and have an associated location identifier for the tile or the partition. In an embodiment, the partitioning of the map into tiles may be population dependent, such that a partition may be determined by the population as opposed to land area.

Application service 105 may service requests from applications on devices, such as applications shown as 136*a*-136*n* on devices in group 110, 137*a*-137*n* on devices in group 111, and 138*a*-138*n* devices in group 112 (hereinafter applications on device groups are referred to as application 136 for ease of description). In some embodiments, a request for data may be sent with application service 105 to the respective devices in groups 110, 111, and 112 using the application 136. In some embodiments, the application 136 may execute the algorithm to determine the encrypted answer 121 sent from participant device 110*a* to the aggregation service 106.

Figure 2:
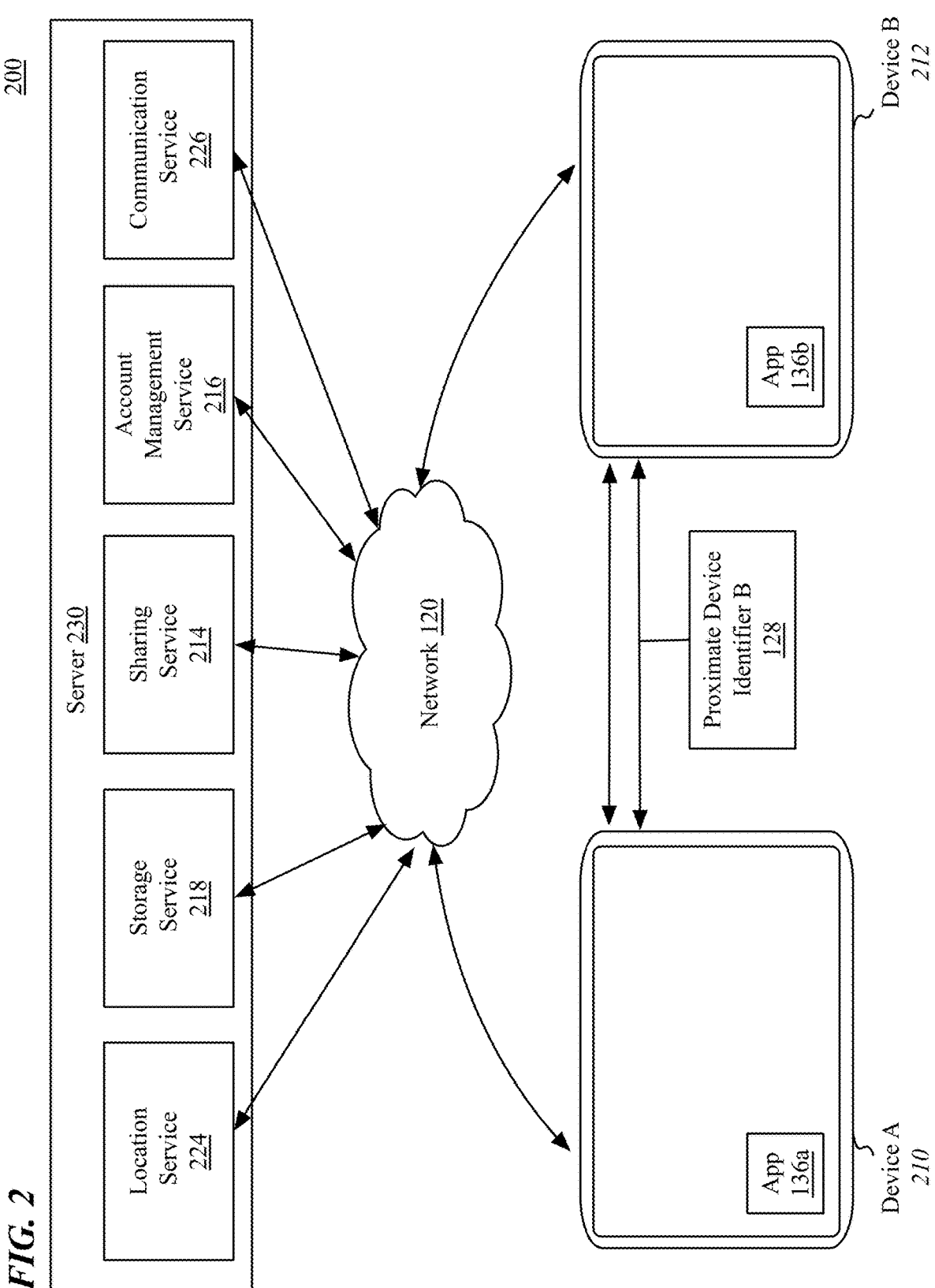
FIG. 2 illustrates a system diagram to enable an aggregation service, according to an embodiment.

FIG. 2 illustrates a system 200 diagram to enable an aggregation service 106, according to an embodiment. System 200 illustrates an embodiment in which devices (e.g., device B 212) that are proximate to device A 210 can be detected. In one embodiment, the system 200 includes a server 230 that can communicate with a set of client participant devices 210 and 212 over a network 120. For ease of description, the embodiment is shown as one server 230 with multiple services. However, those with skill in the art will recognize that the server 230 can be any kind or number of servers, including an individual server, a set of servers, or a cluster of servers offering any number of services. Server 230 may be an implementation of the aggregation server 102, including services such as the aggregation service 106, and/or the aggregation services may be provided separately from a service provider for the user account. Those with skill in the art will also recognize that participant device A 210 and participant device B 212 may not be part of the same ecosystem. The devices 210 and 212 in different ecosystems may access different services, different computing platforms (e.g., operating system and/or hardware), different service providers, and/or have different device manufacturers. The server 230 can also be or include a cloud-based server, application server, backend server, virtual server, or combination thereof. Although a client/server network model is illustrated, any network model may be used, such as peer-to-peer model. Those with skill in the art will recognize that server 230 may offer any number of services, including, but not limited to, the following: a sharing service 214, an account management service 216, a storage service 218, a location service 224 and a communication service (e.g., providing communication functions) 226.

Participant devices 210 and 212 can communicate with each other and the server 230 over network 120 using a variety of communication technologies and protocols with the communication services. In some embodiments, participant device A 210 and participant device B 212 use radio technologies to communicate information over short range distances, such as Bluetooth Low Energy (BLE), Wi-Fi, near-field communication (NFC), or ultra-wide band (UWB).

In some embodiments, server 230 may provide account management service 216 to participant devices 210 and 212 to enable the users to establish user accounts. User accounts may be set up for a single service, a set of services, and/or an account for the participant devices 210 and 212. Data used for analysis and algorithms for the received polling requests on the participant devices 210 and 212 may have been collected from input to the device 210 and/or from various devices (e.g., accessory devices not shown) accessible by the user with the user account, such as data accessible on accessory devices, other trusted devices, and/or other remotely stored data (e.g., remotely stored) accessible with the user account.

User accounts may be set up to require any number of factors or combinations of factors in order to authenticate the user to allow access to user data for the user account. Factors include, but are not limited to, the following: passcodes, credentials, biometric credentials (e.g., facial, iris, fingerprint, voice, etc.), out of band communications (e.g., codes received out of band that must be entered by user and verified), sensor data (e.g., to detect a wearable device is being worn by the user), and/or any other factors to authenticate the user. Storage service 218, such as cloud services, may be used to store user account information, data that is accessible on various devices by the user (e.g., accessory devices) with the user account, and proximate device identifier information. In some embodiments, user account data may be stored locally on the device.

Sharing service 214 may facilitate sharing of information or data between participant device A 210 and participant device B 212. Sharing service 214 may store sharing settings, generate and/or store cryptographic keys, and/or any other sharing information for a device. In one embodiment, the user with user account using participant device A 210 may request to share information with device B 212, and device B 212 may generate a public/private key pair for sharing information between the two devices (210 and 212). Participant devices 210 and 212 may have sharing applications (not shown), such as AirDrop®, that allow the user to designate with settings to request discovery of devices that are proximate to the device. In some embodiments, devices are configured to have user defined settings to indicate if the user wants to discover nearby devices and/or send communications to nearby devices for discovery. Sharing service 214 may offer levels of granularity over which devices the participant devices share information, such as contacts only, everyone, and/or devices identified a part of a group (e.g., an ecosystem). The user may set the level of granularity for discovery of proximate devices with any number of restrictions on the types of devices that may be discovered and/or discover their device. For example, the user may allow any device to discover their device, no devices to discover their device, devices of contacts to discover their device, or any device using the particular aggregation service 105.

As shown in FIG. 2, participant device A 210 and participant device B 212, respectively, may exchange at least one proximate device identifier 128. Participant device A 210 may store the proximate device identifier 128 for later identification of proximate participant devices for an aggregated result (e.g., encrypted aggregation 140). In the simplest case, when participant device A 210 and participant device B 212 are in close proximity, communications (e.g., using short-range communication protocols) may be sent between the two devices that include the proximate device identifier 128 for device B 212. Participant device B 212 may be described as in beaconing proximity to participant device A 210. For example, participant device B 212 may communicate in a BLE packet (e.g., advertisement) the proximate device identifier B 128 to participant device A 210. The BLE packet may have a service identifier to allow for identification of the BLE packet established for use with the application 136a, 136b, and/or the specific polling request.

In some embodiments, participant device A 210 and participant device B 212 may initially pair or previously have been paired and may have the cryptographic keys to decrypt the communications between the devices. Some embodiments may exchange one or more keys to use crowd-sourced locator services provided by location service 224 to locate a proximate device. Examples of devices using location services to identify proximate devices may be found in U.S. patent application Ser. No. 16/543,227 filed Aug. 16, 2019 entitled "A System and Method for Locating Wireless Accessories," which is incorporated by reference herein in its entirety. In some embodiments, user devices may be identified as being proximate as described in U.S. patent application Ser. No. 16/428,683 filed May 31, 2019, entitled "Techniques For Enabling Computing Devices To Identify When They Are In Proximity To One Another," U.S. Pat. No. 9,853,719 filed Sep. 25, 2013, entitled "Discovery of Nearby Devices for File Transfer and Other Communications," and/or U.S. Pat. No. 8,990,273 filed Jan. 13, 2011, entitled "Ad Hoc File Sharing," all of which are incorporated by reference herein in their entirety.

Figure 3A:
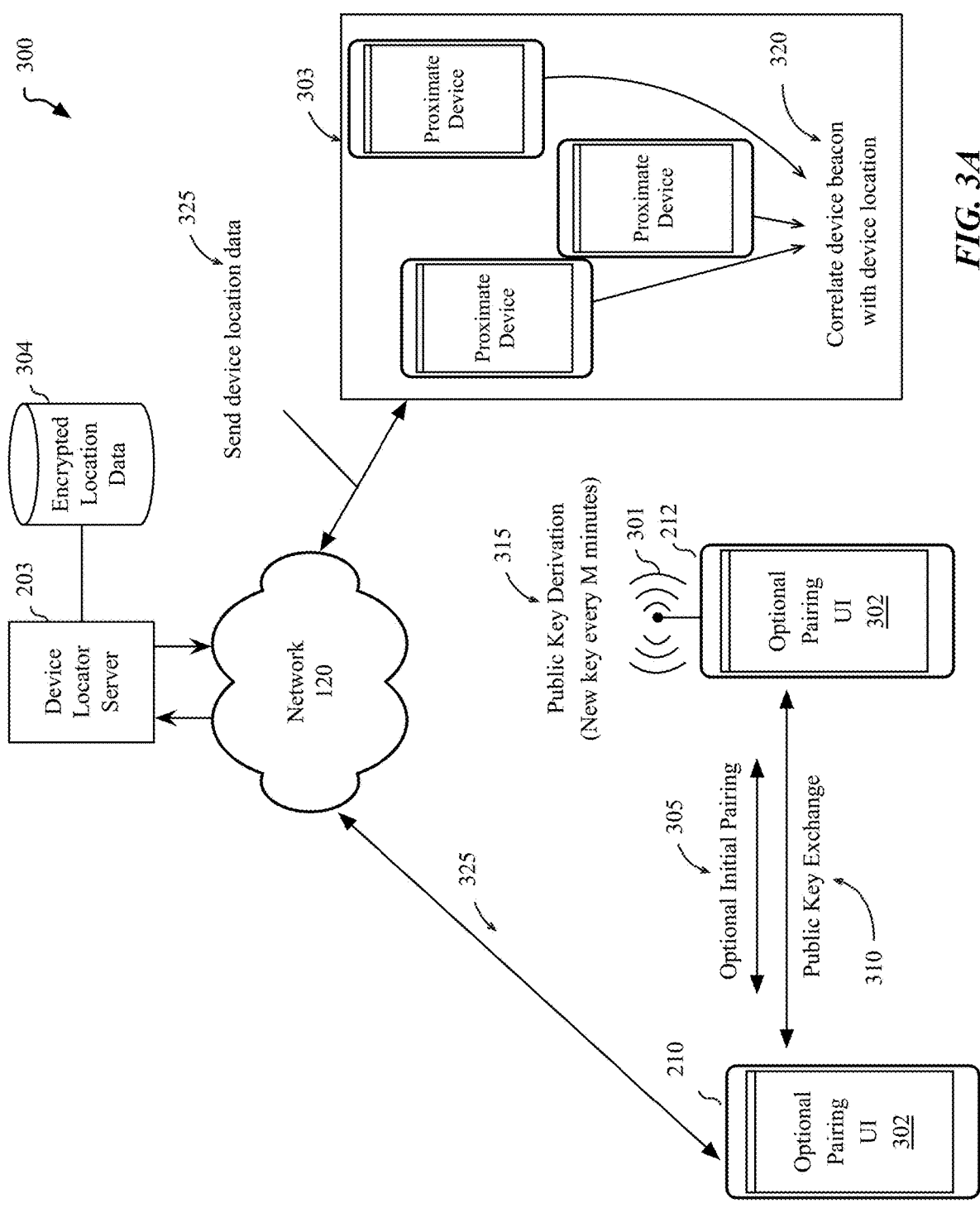
FIG. 3A illustrates a system diagram to enable an aggregation service, according to an embodiment.

FIG. 3A illustrates a system diagram 300 to enable an aggregation service, according to an embodiment. Device locator server 203 is an example embodiment of a location service 104 in FIG. 1. Device locator server 203 may service requests over the network 120 to provide location identifiers stored in location data 304 that correlate 320 device beacon to a device location (as shown with 325) for participant devices 303, 210 and 212, when the proximate device identifier 128 is provided to any of the proximate participant devices (e.g., 210).

Participant device 212 can periodically broadcast a beacon signal 301 that includes a proximate device identifier 128 to participant device 210. In one embodiment, the beacon signal 301 can transmit a variant of beacon advertisement packet associated with a low-energy radio protocol, such as BLE. Participant device 210 may scan periodically for communication packets (e.g., advertisement packet) with the service identifier for a particular poll from the polling service 109. Similarly, participant device 212 may scan periodically for communication packets from device 210, and public keys (e.g., proximate device identifiers 128) may be exchanged between the devices 310 when the devices 210 and 212 are in beaconing proximity.

The proximate device identifier 128 may be a rolling key that is periodically generated on the proximate participant device after a defined period of time has elapsed. In one embodiment, the proximate device identifier 128 is a public key of a private/public key pair that is derived from a hash of a device day key and a time value. In some embodiments, the public key used for the proximate device identifier 128 is generated or rotated into use every M minute 315. The device day key may be a key generated daily after a 24-hour period has elapsed on the participant device 212 using a device key and/or provided by a server to the participant device 212. The device key may be unique to the particular device and/or user of the device. In some embodiments, the device key may be stored on the device by a device manufacturer and/or generated on the participant device. Although examples throughout are provided with the use of public keys, those with skill in the art will recognize that asymmetric keys, symmetric keys, and/or any combination thereof may be used. Optionally, in an embodiment, the devices may be paired 305 and designated with use of a pairing UI 302.

Upon receipt of the proximate device identifier 128, the participant device 210 requests a location identifier (shown as location data 325) from device locator server 203 based on positioning information. Positioning information can be provided by one or more position systems of mobile device 210 including satellite-based positioning systems (e.g., GPS) and wireless radio and/or wireless network-based positioning systems that estimate the location of the mobile device 210 based on the wireless base stations that are within range of the participant device 210.

Figure 3B:
FIG. 3B illustrates a mapping system diagram to enable an aggregation service, according to an embodiment.

FIG. 3B illustrates a mapping system diagram 301 to enable an aggregation service, according to an embodiment. As shown, location data 304 may include the partitioning of an area (e.g., the world) into a set of location tiles (as shown with location identifiers 311A-311P, 321A-321P, 331A-331P, 34A-341P), such that positioning information received by device locator server 203 may map to a particular tile or a partition of a map and have an associated location identifier (311A-311P, 321A-321P, 331A-331P, 34A-341P) for the tile or the partition. In an embodiment, the partitioning of the map into tiles may be population dependent, such that a partition may be determined by the population density as opposed to land area as shown with location identifier 351A. Location identifier 351A is a partition for a portion to capture an area for a city with a higher population density in addition to partitions 331M and 331N that may have been assigned based on land area, population density, or any combination thereof.

In some embodiments, homomorphic encryption schemes may be used that allow for generating location aggregates. For example, computations can be performed at aggregation service 106 to generate aggregate results for how many devices were proximate in a particular partition and, how many proximate devices indicate users that selected a particular candidate or result from the poll. With some homomorphic encryption schemes, computations can be performed to generate a covariance matrix. A covariance matrix is a matrix providing the covariance between pairs of elements of a given vector. By way of example, one can determine who votes for a candidate on Monday and also votes for a candidate on Friday in a poll, and if there are users in common between music selections designated in the poll at a particular location. In the first example, the covariance matrix with elements a, b may be assigned a value of one if a user voted for a candidate on both Monday and Friday, and a value of zero, otherwise.

Figure 4:
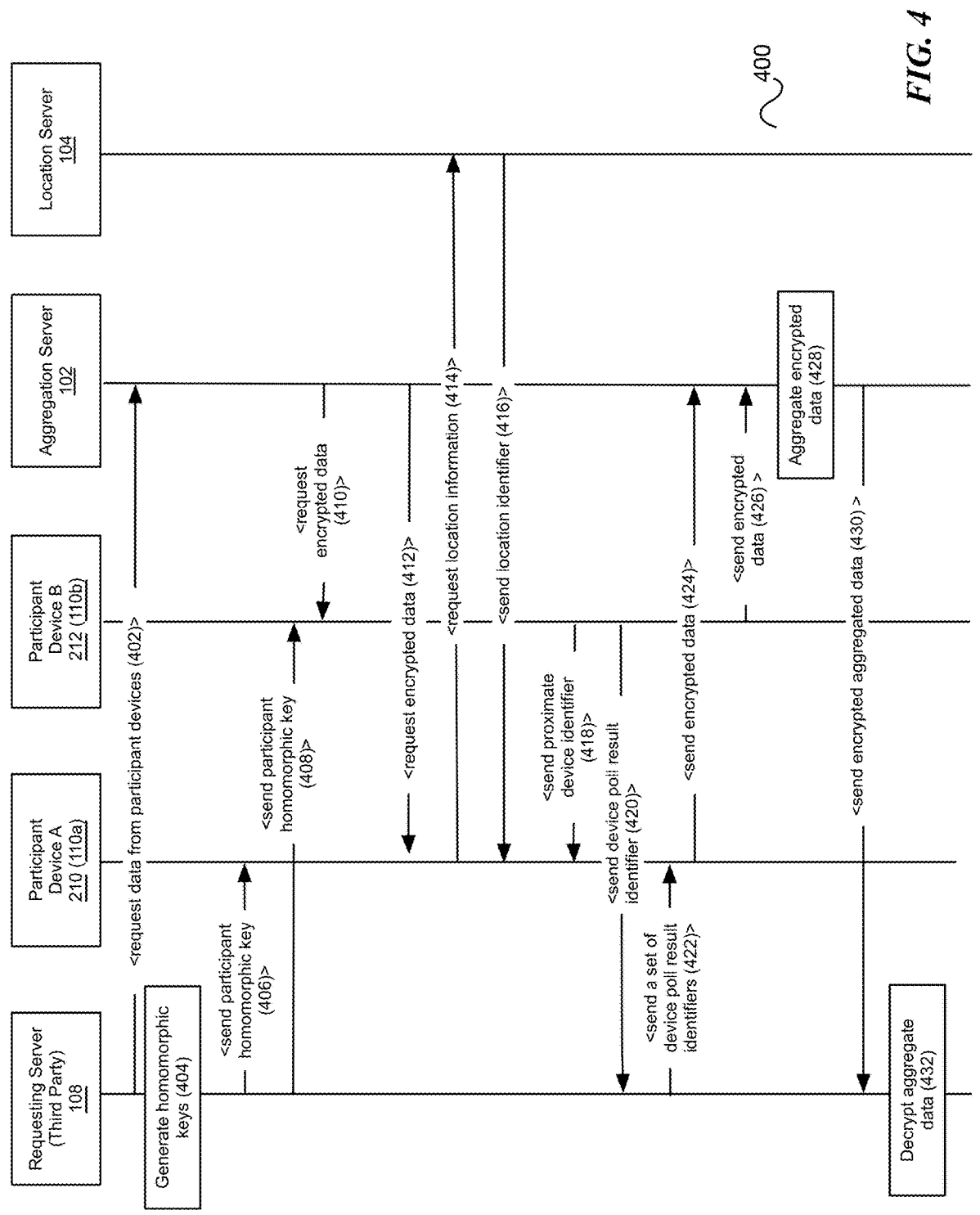
FIG. 4 is an interaction diagram for an aggregation service, according an embodiment.

FIG. 4 is an interaction diagram for an aggregation service, according an embodiment. Interaction diagram 400 illustrates interactions between requesting server 108, participant device A 210 (e.g., a participant device 110a in device group 110) and participant device B 212 (e.g., a participant device 110b in device group 110), aggregation server 102, and location server 104, in an embodiment. A requesting server (e.g., a third party to the aggregation server 102) may request that the aggregation server 102 request data from the participant devices 210 and 212 (402). For example, the requesting server 108 may request an aggregation of data on the selection of a candidate (e.g., a candidate contestant on a show, a candidate music type selection, or another candidate option available for selection, etc.) by the participant devices 210 and 212. Homomorphic keys may be generated (404) and sent by the requesting server 108 to the participant device A 210 (406) and the participant device B 212 (408). In some embodiments, the homomorphic keys allow for encryption of the requested data from the participant devices such that the aggregation server 102 may not access, read, and/or decrypt the requested data from an individual participant device 210 and 212, but computations are possible for the aggregation server 102 to generate the encrypted aggregation result 140. Full or partial (e.g., RSA, 2DNF, etc.) homomorphic encryption may be used. Those with skill in the art will recognize any homomorphic encryption schemes may be used. The aggregations server 102 may request encrypted data from participant device B 212 (410) and participant device A 210 (412). An application 136 installed and/or accessible on the device may be used to request and gather the data requested from the aggregation server 102 on behalf of the requesting server 108.

Each device 210 and 212 generates a new public key to represent increments of time throughout the day. In some embodiments, the public key may be a hash of a key that represents a day (e.g., a 24 hour period) that is hashed with a key representing another increment of time, such as M minutes. Participant device A 210 may request location information (414) from a location server 104 and receive a location identifier (416) in response from the location server 104. Participant device A 210 may associate the location identifier with any received proximate device identifier by participant device A 210 in the location corresponding to the location identifier.

When a participant device B 212 is proximate to the participant device 210, the participant device B 212 may send a proximate device identifier to participant device A 210 (418). Next, the participant device B 212 may send a poll result identifier to the requesting server 108, if the participant device B 212 meets a condition, exceeds a threshold, and/or a particular poll result (420). By way of example, the participant device B 212 may vote for a candidate or indicate approval of a music selection at venue. The poll result identifier may be at least one device day key for the participant device B 212. Next, the requesting server 108 sends a set of device poll result identifiers (422) to participant device A 210. Participant device A 210 may perform a comparison between each received device poll result identifier hashed with ten-minute increments within a 24 hour period associated with the respective device poll result identifier and stored proximate device identifier. Participant device A 210 may send encrypted data (424) indicating whether any of the set of device poll result identifiers matched any proximate device identifiers received at participant device A 210. Participant device A 210 may send comparison results in addition to any other data requested by the aggregation service. Similarly, participant device B 212 may send encrypted data (426) to aggregation server 102 (426). Participant device A 210 and participant device B 212 may have data encrypted with their respective homomorphic keys from steps (406) and (408) respectively. Aggregation server 102 may aggregate the encrypted data (428) and send to the encrypted data to the requesting server 108 (430). The requesting server 108 may decrypt the aggregated data (432).

Figure 5:
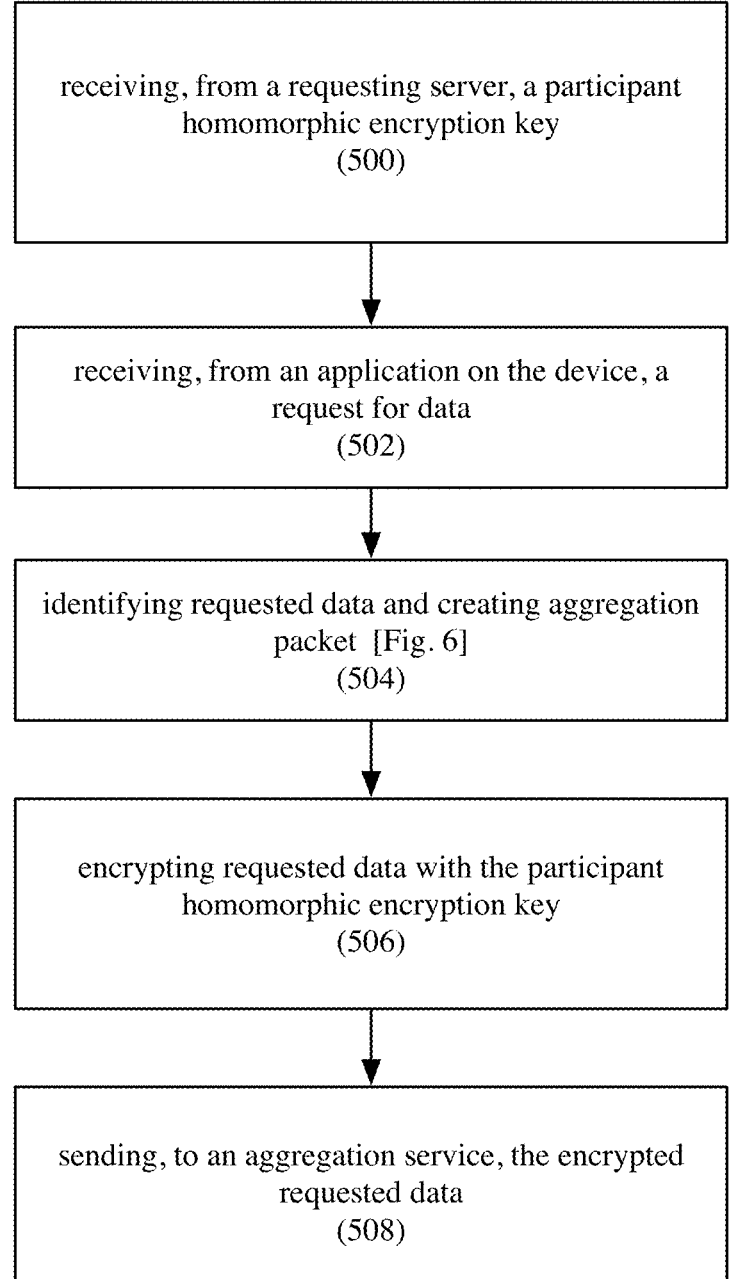
FIG. 5 is a flow diagram of a method for an aggregation service, according an embodiment.

FIG. 5 is a flow diagram of a method for an aggregation service, according an embodiment. Initially, a requesting service 108, may provide a participant homomorphic encryption key (500) to participating devices A 210 and B 212 (e.g., participant devices in groups 110, 111, and 112). An application 136*a* on the participant device 210 may request the collection of data from the participant device A 210 for aggregated data (502). A request may be sent from the requesting server 108 to the aggregation server 102 to request the collection of data. The data may be any data permitted by the participant device A 210 user to be collected. Data is identified and an aggregation packet is created, as described in FIG. 6 (504). The aggregation packet is encrypted with the participant homomorphic key (506) and sent as the requested data to the aggregation server 102 (508). Full or partial homomorphic encryption may be used.

FIG. 6 is a flow diagram of a method for an aggregation service, according an embodiment. In particular, FIG. 6 illustrates a method for creation of an aggregation packet that is encrypted in response to a request for aggregated data from requesting service 108. Initially, a participant device A 210 may receive a proximate device identifier 128 (602) from a proximate participant device B 212. The participant device A 210 may associate a location identifier from the location server 104 with the proximate device identifier 128 and store the association (604). Positioning information may be sent to the location server 104 to retrieve a corresponding location identifier for the location at the time of receipt or immediately following receipt of the proximate device identifier.

Next, the participant device A 210 may receive at least one device poll result identifier (606). For example, the requesting party 108 may send a plurality of device poll result identifiers for all devices that meet a particular condition to the participant device A 210. Participant devices 210 and 212 may send information to the requesting server 108 on conditions relevant to the poll offered by polling service 109. In an embodiment, device poll result identifier may be a device day key for a participant device (e.g., participant device B 212) that selected a particular candidate or satisfied a particular condition. The received device poll result identifier may be hashed with a time value to be compared against stored proximate device identifiers at the device. By way of example, the device poll result identifier may be hashed with a set of values representing ten-minute time increments during a 24-hour period, and each hash value may be compared to the received proximate device identifiers received by the device. Device poll result identifiers that correspond to received proximate device identifiers may be identified (608). The device may identify all location identifiers associated with identified proximate device identifiers for the aggregation packet. In some embodiments, additional device poll result identifiers and location identifiers may be selected for the aggregation packet to inject noise into the encrypted aggregation result (610). Each identified location identifier and device poll result identifier in the aggregation packet may have an encrypted associated value indicative of whether a proximate device was identified as a match to the device poll result identifier and/or the location identifier associated with the interaction. The aggregation packet may then be encrypted. The aggregation server 102 may use the properties of homomorphic encryption to build aggregates of the information from all of the devices (e.g., sums, counts, correlations).

FIG. 7 is a flow diagram of a method for an aggregation service, according an embodiment. Initially, a participant device 210 is sent a request for data to perform a computation (702). Requesting server 108 may send a request to the aggregation service 106 at the aggregation server 102 to request the data to perform the computation from participant devices (e.g., participant 210 via the application 136*a*). Requesting server 108 may send a homomorphic public key to the participant device to allow for encryption of the answer with the data to perform the computation at the aggregation server 102 (704). The participant device 210 may send the requested data encrypted with a homomorphic key (706). Next, the computation may be performed with the encrypted requested data from a plurality of participant devices, and the aggregated encrypted result may be sent to at least one requesting server 108 (708). Optionally, noise may be injected into the aggregated encrypted result (710) by providing random data in addition to the aggregated encrypted result and/or into the computation.

FIG. 8 is a block diagram illustrating an exemplary API architecture, which may be used in some embodiments of the invention. As shown in FIG. 8, the API architecture 800 includes the API-implementing component 810 (e.g., an operating system, a library, a device driver, an API, an application program, software or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and accesses the API-implementing component 810 using the API 820 over a network. While FIG. 8 illustrates a single instance of the API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 9:
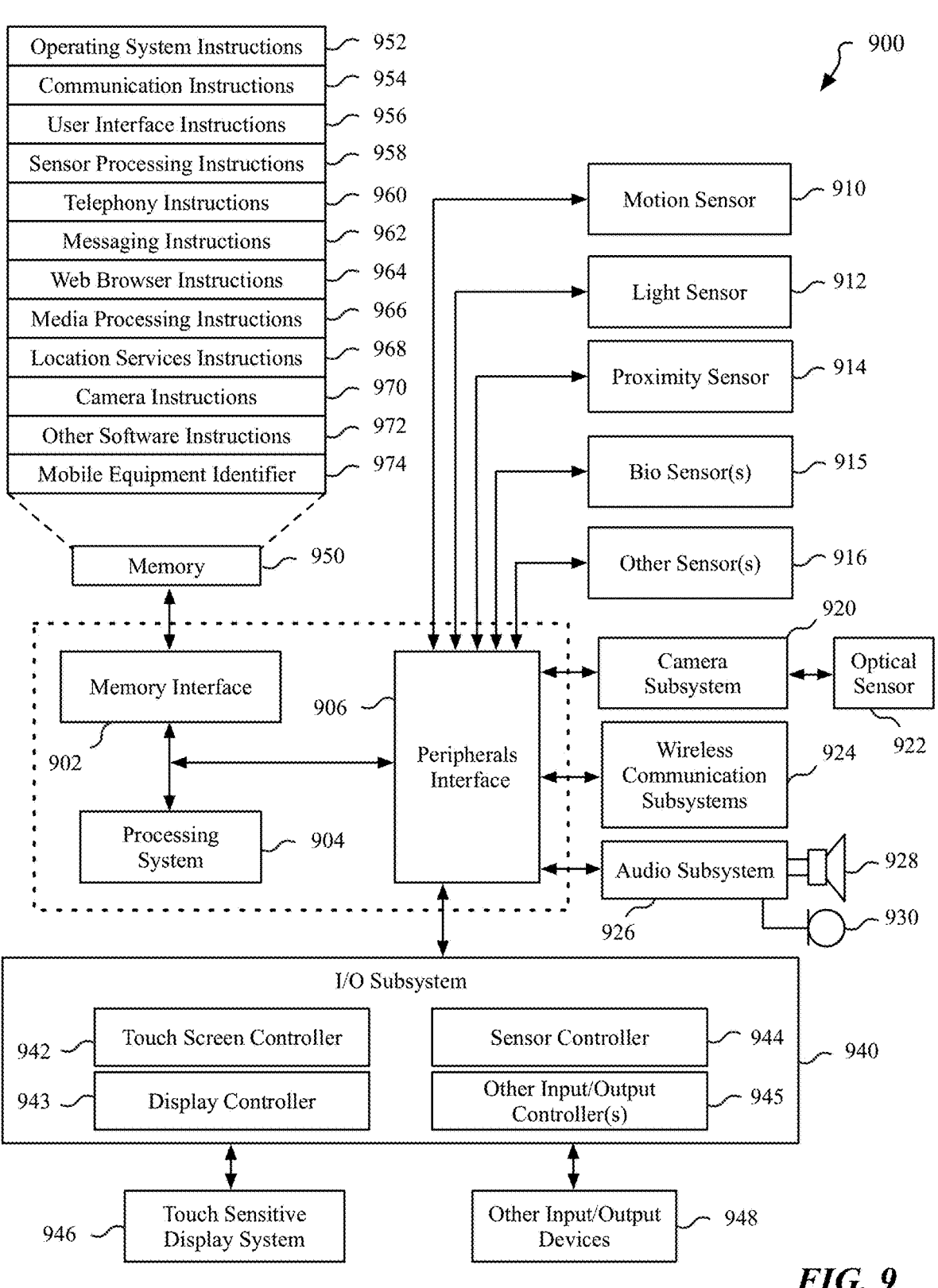
FIG. 9 is a block diagram of a device architecture for a mobile or embedded device, according to an embodiment.

FIG. 9 is a block diagram of a device architecture 900 for a mobile or embedded device, according to an embodiment. The device architecture 900 includes a memory interface 902, a processing system 904 including one or more data processors, image processors and/or graphics processing units, and a peripherals interface 906. The various components can be coupled by one or more communication buses or signal lines. The various components can be separate logical components or devices or can be integrated in one or more integrated circuits, such as in a system on a chip integrated circuit.

The memory interface 902 can be coupled to memory 950, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the mobile device functionality. One or more biometric sensor(s) 915 may also be present, such as a fingerprint scanner for fingerprint recognition or an image sensor for facial recognition. Other sensors 916 can also be connected to the peripherals interface 906, such as a positioning system (e.g., GPS receiver), a temperature sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the wireless communication subsystems 924 can depend on the communication network(s) over which a mobile device is intended to operate. For example, a mobile device including the illustrated device architecture 900 can include wireless communication subsystems 924 designed to operate over a GSM network, a CDMA network, an LTE network, a Wi-Fi network, a Bluetooth network, or any other wireless network. In particular, the wireless communication subsystems 924 can provide a communications mechanism over which a media playback application can retrieve resources from a remote media server or scheduled events from a remote calendar or event server.

An audio subsystem 926 can be coupled to a speaker 928 and a microphone 930 to facilitate voice-enabled functions, such as voice recognition, voice replication, digital recording, and telephony functions. In smart media devices described herein, the audio subsystem 926 can be a high-quality audio system including support for virtual surround sound.

The I/O subsystem 940 can include a touchscreen controller 942 and/or other input controller(s) 945. For computing devices including a display device, the touchscreen controller 942 can be coupled to a touch sensitive display system 946 (e.g., touchscreen). The touch sensitive display system 946 and touchscreen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment, the display controller 943 can provide frame data to the touch sensitive display system 946 at a variable frame rate.

In one embodiment, a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment, the I/O subsystem 940 includes other input controller(s) 945 that can be coupled to other input/control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can be a kernel.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

Figure 10:
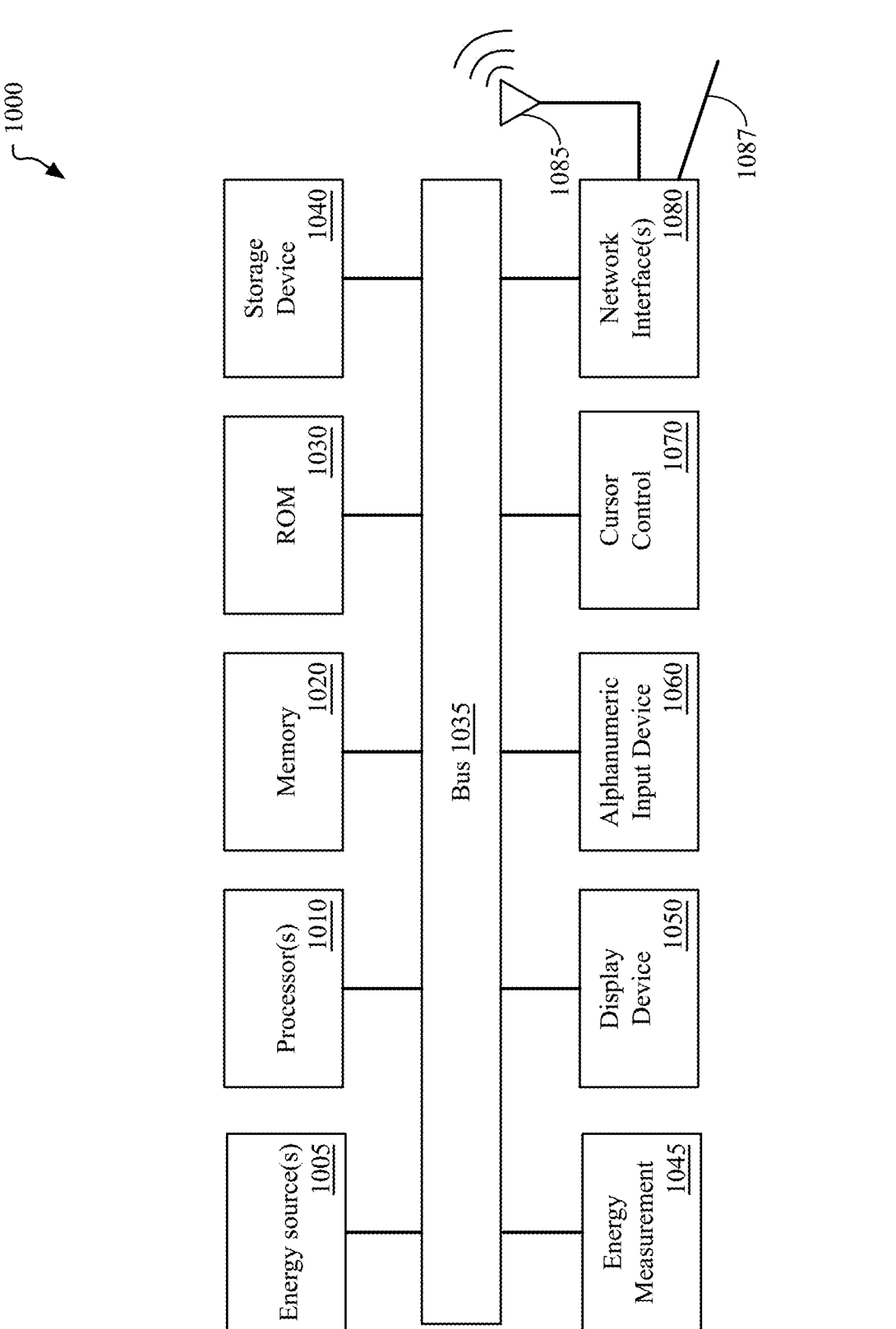
FIG. 10 is a block diagram of a computing system, according to an embodiment.

FIG. 10 is a block diagram of a computing system 1000, according to an embodiment. The illustrated computing system 1000 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1000 can be used to provide the computing device and/or a server device to which the computing device may connect.

The computing system 1000 includes bus 1035 or other communication device to communicate information, and processor(s) 1010 coupled to bus 1035 that may process information. While the computing system 1000 is illustrated with a single processor, the computing system 1000 may include multiple processors and/or co-processors. The computing system 1000 further may include memory 1020 in the form of random-access memory (RAM) or other dynamic storage device coupled to the bus 1035. The memory 1020 may store information and instructions that may be executed by processor(s) 1010. The memory 1020 may also be main memory that is used to store temporary variables or other intermediate information during execution of instructions by the processor(s) 1010.

The computing system 1000 may also include read only memory (ROM) 1030 and/or another data storage device 1040 coupled to the bus 1035 that may store information and instructions for the processor(s) 1010. The data storage device 1040 can be or include a variety of storage devices, such as a flash memory device, a magnetic disk, or an optical disc and may be coupled to computing system 1000 via the bus 1035 or via a remote peripheral interface.

The computing system 1000 may also be coupled, via the bus 1035, to a display device 1050 to display information to a user. The computing system 1000 can also include an alphanumeric input device 1060, including alphanumeric and other keys, which may be coupled to bus 1035 to communicate information and command selections to processor(s) 1010. Another type of user input device includes a cursor control 1070 device, such as a touchpad, a mouse, a trackball, or cursor direction keys to communicate direction information and command selections to processor(s) 1010 and to control cursor movement on the display device 1050. The computing system 1000 may also receive user input from a remote device that is communicatively coupled via one or more network interface(s) 1080.

The computing system 1000 further may include one or more network interface(s) 1080 to provide access to a network, such as a local area network. The network interface(s) 1080 may include, for example, a wireless network interface having antenna 1085, which may represent one or more antenna(e). The computing system 1000 can include multiple wireless network interfaces such as a combination of Wi-Fi, Bluetooth®, near field communication (NFC), and/or cellular telephony interfaces. The network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, the network interface(s) 1080 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1000 can further include one or more energy sources 1005 and one or more energy measurement systems 1045. Energy sources 1005 can include an AC/DC adapter coupled to an external power source, one or more batteries, one or more charge storage devices, a USB charger, or other energy source. Energy measurement systems include at least one voltage or amperage measuring device that can measure energy consumed by the computing system 1000 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, one aspect of the present technology is the gathering and use of data available from various specific and legitimate sources to enable aggregate data. The present disclosure contemplates that in some instances, this gathered data may include personal information data that uniquely identifies or can be used to identify a specific person. Such personal information data can include demographic data, location-based data, online identifiers, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to learn preferences or polling results, and to enable a service or an electronic device to better anticipate the needs of a set of participant users. Further, other uses for personal information data that benefit the user are also contemplated by the present disclosure. For instance, health and fitness data may be used, in accordance with the user's preferences, to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), use of homomorphic encryption, threshold cryptosystems, and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, crowdsourcing of sequences can be performed over a large number of users and is based on aggregated, non-personal information data. A large number of individual users can opt out of sending data to the sequence learning server and overall trends can still be detected.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

The terms "above", "over", "to", "between", "spanning" and "on" as used herein may refer to a relative position of one layer with respect to other layers. One layer "above", "over", "spanning" or "on" another layer or bonded "to" or in "contact" with another layer may be directly in contact with the other layer or may have one or more intervening layers. One layer "between" layers may be directly in contact with the layers or may have one or more intervening layers.

In utilizing the various aspects of the embodiments, it would become apparent to one skilled in the art that combinations or variations of the above embodiments are possible. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method for an aggregation server providing aggregation services, the method comprising:

sending, by the aggregation server to a plurality of participant devices, a request for data for performing a computation to generate an aggregated encrypted result;

receiving, from the plurality of participant devices, the requested data encrypted with a homomorphic key;

generating the aggregated encrypted result by performing the computation using the requested data received from the plurality of participant devices; and sending, to at least one requesting server, the generated aggregated encrypted result.

2. The method according to claim 1, the method further comprising injecting noise in the aggregated encrypted result.

3. The method according to claim 2, wherein the noise that is injected in the aggregated encrypted result comprises a plurality of device poll result identifiers and a plurality of location identifiers.

4. The method according to claim 3, wherein each of the plurality of device poll result identifiers and each of the plurality of location identifiers comprise an encrypted associated value that indicates whether a proximate device was identified as a match to a device poll result identifier and/or whether the proximate device was identified as a match to a location identifier associated with an interaction between participating devices.

5. The method according to claim 2, wherein the noise that is injected in the aggregated encrypted result comprises random data added to the computation.

6. The method according to claim 1, wherein the computation is performed based on a request by the requesting server.

7. The method according to claim 1, wherein the aggregated encrypted result generated with the requested data received from the plurality of participant devices is aggregated using sums, counts, and/or correlations.

8. The method according to claim 1, wherein the computation is performed by the aggregation server without reading the data received from each of the plurality of participant devices.

9. The method according to claim 1, wherein the aggregation server is configured to provide a location service, an application service, and/or an aggregation service.

10. The method according to claim 1, wherein the requested data comprises crowdsourced data.

11. The method according to claim 1, wherein the computation comprises a full or partial mathematical computation.

12. The method according to claim 11, wherein the full or partial mathematical computation comprises a sum, a count, an average, a minimum, a maximum, and/or a median.

13. An aggregation server comprising:

a memory to store instructions; and one or more processors to execute the instructions, wherein the instructions cause the one or more processors to perform operations comprising:

sending, by the aggregation server to a plurality of participant devices, a request for data for performing a computation to generate an aggregated encrypted result;

receiving, from the plurality of participant devices, the requested data encrypted with a homomorphic key;

generating the aggregated encrypted result by performing the computation using the requested data received from the plurality of participant devices; and sending, to at least one requesting server, the generated aggregated encrypted result.

14. The aggregation server according to claim 13, further comprising instructions that cause the one or more processors to perform an operation comprising injecting noise in the aggregated encrypted result.

15. The aggregation server according to claim 14, wherein the noise that is injected in the aggregated encrypted result comprises a plurality of device poll result identifiers and a plurality of location identifiers.

16. The aggregation server according to claim 15, wherein each of the plurality of device poll result identifiers and each of the plurality of location identifiers comprise an encrypted associated value that indicates whether a proximate device was identified as a match to a device poll result identifier and/or whether the proximate device was identified as a match to a location identifier associated with an interaction between participating devices.

17. A non-transitory machine-readable medium having instructions stored thereon, wherein the instructions cause one or more processors of an aggregation server to perform operations comprising:

sending, by the aggregation server to a plurality of participant devices, a request for data for performing a computation to generate an aggregated encrypted result;

receiving, from the plurality of participant devices, the requested data encrypted with a homomorphic key;

generating the aggregated encrypted result by performing the computation using the requested data received from the plurality of participant devices; and sending, to at least one requesting server, the generated aggregated encrypted result.

18. The non-transitory machine-readable medium according to claim 17, further comprising instructions that cause the one or more processors to perform an operation comprising injecting noise in the aggregated encrypted result.

19. The non-transitory machine-readable medium according to claim 18, wherein the noise that is injected in the aggregated encrypted result comprises a plurality of device poll result identifiers and a plurality of location identifiers.

20. The non-transitory machine-readable medium according to claim 19, wherein each of the plurality of device poll result identifiers and each of the plurality of location identifiers comprise an encrypted associated value that indicates whether a proximate device was identified as a match to a device poll result identifier and/or whether the proximate device was identified as a match to a location identifier associated with an interaction between participating devices.

* * * * *